US005631216A

United States Patent [19]

Morris et al.

[11] Patent Number: 5,631,216

[45] Date of Patent: *May 20, 1997

[54] INDUSTRIAL AND INSTITUTIONAL LIQUID CLEANING COMPOSITIONS CONTAINING ALKYL POLYGLYCOSIDE SURFACTANTS

[75] Inventors: Timothy C. Morris, Morton; Michael Hansberry, Conshohocken, both of Pa.; John F. Hessel, Metuchen, N.J.

[73] Assignee: Henkel Corporation, Plymouth Meeting, Pa.

[ * ] Notice: The portion of the term of this patent subsequent to Feb. 16, 2015, has been disclaimed.

[21] Appl. No.: 603,836

[22] Filed: Feb. 22, 1996

Related U.S. Application Data

[63] Continuation of Ser. No. 389,837, Feb. 16, 1995, Pat. No. 5,525,256.

[51] Int. Cl.$^6$ .............................. C11D 1/66; C11D 3/00; B01J 13/00

[52] U.S. Cl. .......................... 510/276; 510/340; 510/337; 510/342; 510/352; 510/511

[58] Field of Search .............................. 252/108, 174.17, 252/174.18, 174.23, 173, 315.01, 315.3, DIG. 1, DIG. 2; 510/276, 340, 337, 342, 352, 511

[56] References Cited

U.S. PATENT DOCUMENTS

| | | | |
|---|---|---|---|
| 3,721,033 | 3/1973 | Ranauto | 252/527 |
| 4,780,234 | 10/1988 | Malik et al. | 252/135 |
| 5,047,167 | 9/1991 | Steyn et al. | 252/160 |
| 5,308,531 | 5/1994 | Urfer et al. | 252/174.17 |
| 5,370,816 | 12/1994 | Balzer et al. | 252/132 |
| 5,374,369 | 12/1994 | Angevaare et al. | 252/102 |
| 5,385,750 | 1/1995 | Aleksejczyk et al. | 427/4 |
| 5,525,256 | 6/1996 | Morris et al. | 252/108 |

*Primary Examiner*—Helane Myers
*Assistant Examiner*—Patricia L. Hailey
*Attorney, Agent, or Firm*—Wayne C. Jaeschke; John E. Drach; Henry E. Millson, Jr.

[57] ABSTRACT

Alkyl polyglycoside containing industrial and institutional liquid cleaning compositions which provide for the elimination, or the reduction in the amount, of stabilizing agents.

21 Claims, No Drawings

INDUSTRIAL AND INSTITUTIONAL LIQUID CLEANING COMPOSITIONS CONTAINING ALKYL POLYGLYCOSIDE SURFACTANTS

This application is a continuation of application Ser. No. 08/389,837, filed Feb. 16, 1995, now U.S. Pat. No. 5,525, 256.

FIELD OF THE INVENTION

The invention relates to industrial and institutional liquid cleaning compositions which contain alkyl polyglycoside surfactants.

BACKGROUND OF THE INVENTION

There are two basic types of industrial and institutional liquid laundry cleaning systems which are currently used. One system involves two separate products which are used together. Typically these two products include a liquid surfactant blend and a liquid alkaline builder (commonly referred to as an alkali break). The other type of system is a liquid product that contains both a surfactant and an alkaline builder. This type of product is commonly referred to as a one-shot detergent due to the fact that it is designed to be used alone.

One-shot detergent blends typically contain surfactants/stabilizers (i.e. hydrotropes and/or polymers)/alkaline builders. In systems of this type the stability of the detergent blend becomes equally as important as the detergency performance of the detergent blend. Furthermore, the hydrotrope (e.g. phosphate esters) and polymer (e.g. high molecular weight acrylic polymers) stabilizers are expensive to use, provide limited shelf-life stability and add little to the cleaning performance of the system.

Accordingly, there is a need for developing stable industrial and institutional "one-shot" liquid laundry cleaning compositions which provide for the elimination, or the reduction in the amount, of these expensive stabilizing agents and which further provide for effective cleaning performance under various soil loads and wash conditions.

SUMMARY OF THE INVENTION

The invention relates to an industrial and institutional liquid cleaning composition which comprises:

(a) from about 1% to about 30% active by weight of a 1:1 to 1:0 mixture of an alkyl polyglycoside in which the alkyl group contains 12 to 16 carbon atoms to an alkyl polyglycoside in which the alkyl group contains 8 to 10 carbon atoms;

(b) from 0% to about 50% by weight of an alkali metal hydroxide;

(c) from 0% to about 40% by weight of an alkali metal silicate;

(d) from 0% to about 40% by weight of a builder;

(e) from 0% to about 5% by weight of a dispersing/antiredeposition agent;

(f) from about 5% to about 75% by weight of water; and (g) from 0% to about 5% by weight of a hydrotrope; with the proviso that the sum of the percentages for the alkali metal hydroxide, alkali metal silicate and the builder must be greater than zero.

The compositions of the instant invention have been shown to be stable liquid cleaning compositions which exhibit effective cleaning performance and, hence, would be useful in industrial and institutional liquid cleaning applications such as hard surface cleaning (i.e. vehicle wash, bottle wash and in situ cleaners) and laundry applications. The compositions of the instant invention have been found to be especially useful in liquid laundry cleaning applications.

The preferred compositions of the invention are those which comprise:

(a) from about 10% to about 20% active by weight of a 1:1 to 1:0 mixture of an alkyl polyglycoside in which the alkyl group contains 12 to 16 carbon atoms to an alkyl polyglycoside in which the alkyl group contains 8 to 10 carbon atoms;

(b) from about 12% to about 45% by weight of said alkali metal hydroxide;

(c) from about 2% to about 36% by weight of said alkali metal silicate;

(d) from 0% to about 10% by weight of said builder;

(e) from 0% to about 4% by weight of said dispersing/antiredeposition agent;

(f) from about 25% to about 75% by weight of said water; and (g) from 0% to about 5% by weight of a hydrotrope selected from ethanol or sodium xylene sulfonate.

Particularly preferred compositions of the invention are those which comprise:

(a) about 10% active by weight of a 1:1 to 1:0 mixture of an alkyl polyglycoside which has an average degree of polymerization of 1.4 glucose units and in which the alkyl group contains 12 to 16 carbon atoms to an alkyl polyglycoside which has an average degree of polymerization of 1.6 glucose units and in which the alkyl group contains 8 to 10 carbon atoms;

(b) from about 12.6% to about 17% by weight of said alkali metal hydroxide;

(c) from about 4.7% to about 14% by weight of said alkali metal silicate;

(d) from 0% to about 6% by weight of said builder;

(e) from 0% to about 1.4% by weight of said dispersing/antiredeposition agent;

(f) from about 40% to about 75% by weight of said water; and (g) from 0% to about 5% by weight of ethanol or from 0% to about 2.4% by weight of sodium xylene sulfonate.

Especially particularly preferred compositions of the invention for moderately alkaline industrial and institutional liquid cleaning applications, especially liquid laundry applications, are I: those which comprise (a) 10% active by weight of a 2:1 mixture of an alkyl polyglycoside which has an average degree of polymerization of 1.4 glucose units and in which the alkyl group contains 12 to 16 carbon atoms, especially GLUCOPON® 600, to an alkyl polyglycoside which has an average degree of polymerization of 1.6 glucose units and in which the alkyl group contains 8 to 10 carbon atoms, especially GLUCOPON® 225; (b) 12.6% by weight of potassium hydroxide; (c) 4.7% by weight of a potassium silicate, especially KASIL® #6; (d) 6.0% by weight of tetrapotassium pyrophosphate; (e) 1.4% by weight of an acrylic/maleic copolymer, especially ACUSOL® 505N; and (f) 65.3% by weight of water; or II: those which contain (a) 10% active by weight of a 1:0 mixture of an alkyl polyglycoside which has an average degree of polymerization of 1.4 glucose units and in which the alkyl group contains 12 to 16 carbon atoms, especially GLUCOPON® 600, to an alkyl polyglycoside which has an average degree of polymerization of 1.6 glucose units and in which the alkyl group contains 8 to 10 carbon atoms, especially GLUCOPON® 225; (b) 12.6% by weight of potassium hydroxide; (c) 4.7% by weight of a potassium silicate, especially KASIL® #6; (d) 6.0% by weight of tetrapotassium pyrophosphate; (e) 1.4% by weight of an acrlyic/maleic copolymer, especially ACUSOL® 505N; (f) 64.1% by weight of water; and (g) 1.2% by weight of sodium xylene sulfonate.

Especially particularly preferred compositions of the invention for highly alkaline industrial and institutional liquid cleaning applications, especially liquid laundry applications, are I: those which comprise (a) 10% active by weight of a 2:1 mixture of an alkyl polyglycoside which has an average degree of polymerization of 1.4 glucose units and in which the alkyl group contains 12 to 16 carbon atoms, especially GLUCOPON® 600, to an alkyl polyglycoside which has an average degree of polymerization of 1.6 glucose units and in which the alkyl group contains 8 to 10 carbon atoms, especially GLUCOPON® 225; (b) 17% by weight of potassium hydroxide; (c) 14% by weight of a potassium silicate, especially KASIL® #6; and (d) 59% by weight of water; or II: those which contain (a) 10% active by weight of a 1:0 mixture of an alkyl polyglycoside which has an average degree of polymerization of 1.4 glucose units and in which the alkyl group contains 12 to 16 carbon atoms, especially GLUCOPON® 600, to an alkyl polyglycoside which has an average degree of polymerization of 1.6 glucose units and in which the alkyl group contains 8 to 10 carbon atoms, especially GLUCOPON® 225; (b) 17% by weight of potassium hydroxide; (c) 14% by weight of a potassium silicate, especially KASIL® #6; (d) 57.8% by weight of water; and (e) 1.2% by weight of sodium xylene sulfonate.

The invention also relates to a method for modifying the rheology of compositions of the invention which contain a 1:0 mixture of an alkyl polyglycoside in which the alkyl group contains 12 to 16 carbon atoms to an alkyl polyglycoside in which the alkyl group contains 8 to 10 carbon atoms from a gel to a liquid which comprises adding an effective rheology modifying amount of ethanol or sodium xylene sulfonate to said compositions.

DETAILED DESCRIPTION INCLUSIVE OF THE PREFERRED EMBODIMENTS

A representative example of a $C_{12}$ to $C_{16}$ alkyl polyglycoside is GLUCOPON® 600 which is an alkyl polyglycoside surfactant solution (50% active) which has an average degree of polymerization of 1.4 glucose units, a hydrophilic-lipophilic balance of 11.6 (calculated value) and in which the alkyl group contains 12 to 16 carbon atoms (average $C_{12.8}$). A representative example of a $C_8$ to $C_{10}$ alkyl polyglycoside is GLUCOPON® 225 which is an alkyl polyglycoside surfactant solution (65% active) which has an average degree of polymerization of 1.6 glucose units, a hydrophilic-lipophilic balance of 13.6 (calculated value) and in which the alkyl group contains 8 to 10 carbon atoms (average $C_{9.1}$). Such surfactants are commercially available from Henkel Corporation, Ambler, Pa. 19002 and are described in U.S. Pat. No. 5,266,690, the entire contents of which are incorporated herein by reference.

The alkali metal hydroxide is preferably lithium, sodium or potassium hydroxide, or mixtures thereof, more preferably sodium or potassium hydroxide, especially potassium hydroxide.

The alkali metal silicate is, for example, sodium silicate having $SiO_2$:$Na_2O$ ratios from 3.25 to 1.6 (commercially available from The PQ Corporation, Valley Forge, Pa. 19482), or potassium silicate having $SiO_2$:$K_2O$ ratios of 1.60 to 2.50 (commercially available from The PQ Corporation as KASIL® or KASOLV®), or mixtures thereof. The alkali metal silicate is preferably potassium silicate and especially KASIL® #6 2.5 ratio $SiO_2$:$K_2O$.

The builders of the invention include, but are not limited thereto, the alkali metal, ammonium and alkanolammonium salts of phosphates, phosphonates, carbonates, citric acid, gluconic acid, ethylenediaminetetraacetic acid (EDTA)and nitrilotriacetic acid (NTA).

Examples of carbonate builders are the alkaline earth and alkali metal carbonates, including sodium and potassium carbonate and sesquicarbonate or mixtures thereof.

Examples of phosphate builders are the alkali metal tripolyphosphates, alkali metal and ammonium pyrophosphates, sodium and potassium orthophosphate, and sodium polymeta phosphate in which the degree of polymerization ranges from about 6 to about 21 or mixtures thereof.

Examples of phosphonate builders are the water-soluble salts of ethane 1-hydroxy-1, 1-diphosphonate, particularly the sodium and potassium salts, the water-soluble salts of methylene diphosphonic acid e.g. the trisodium and tripotassium salts and the water-soluble salts of substituted methylene diphosphonic acids, such as the trisodium and tripotassium ethylidene, isopropylidene, benzylmethylidene and halomethylidene phosphonates or mixtures thereof. Phosphonate builder salts of the aforementioned types are disclosed in U.S. Pat. Nos. 3,159,581, 3,213,030, 3,422,021, 3,400,148 and 3,422,137, said disclosures being incorporated herein by reference.

The preferred builders of the invention are the phosphates, especially the alkali metal pyrophosphates and most especially tetrapotssium pyrophosphate.

The dispersing/antiredeposition agents of the invention include, but are not limited thereto, polymeric polycarboxylates, polyethylene glycols, polyvinylpyrrolidone, hydroxymethyl cellulose, hydroxyethyl cellulose and carboxymethyl cellulose.

Polycarboxylate materials which can be employed as the polymeric dispersing/antiredeposition agents herein are those polymers or copolymers which contain at least about 60% by weight of segments with the general formula:

$$[-C(X)(Y)-C(Z)(COOM)-]_n$$

wherein X, Y, and Z are each selected from the group consisting of hydrogen, methyl, carboxy, carboxymethyl, hydroxy and hydroxymethyl; a salt-forming cation and n is from about 30 to about 400. Preferably, X is hydrogen or hydroxy, Y is hydrogen or carboxy, Z is hydrogen and M is hydrogen, alkali metal, ammonia or substituted ammonium.

Polymeric polycarboxylate materials of this type can be prepared by polymerizing or copolymerizing suitable unsaturated monomers, preferably in their acid form. Unsaturated monomeric acids that can be polmerized to form suitable polymeric polycarboxylates include acrylic acid, maleic acid (or maleic anhydride), fumaric acid, itaconic acid, aconitic acid, mesaconic acid, citraconic acid and methylenemalonic acid.

Particularly suitable polymeric polycarboxylates can be derived from acrylic acid. Such acrylic acid-based polymers which are useful herein are the water-soluble salts of polymerized acrylic acid. The average molecular weight of such polymers in the acid form preferably ranges from about 2,000 to about 10,000, more preferably from about 4,000 to about 7,000 and most preferably from about 4,000 to about 5,000. Water-soluble salts of such acrylic acid polymers can include, for example, the alkali metal, ammonium and substituted ammonium salts. Soluble polymers of this type are known materials. Use of polyacrylates of this type in detergent compositions has been disclosed, for example, in U.S. Pat. No. 3,308,067 which is incorporated herein by reference.

Acrylic/maleic copolymers may also be used as the dispersing/antiredeposition agent. Such materials include the water-soluble salts of copolymers of acrylic acid and maleic acid. The average molecular weight of such copolymers in the acid form ranges from about 2,000 to about 100,000, preferably from about 4,000 to about 75,000, more preferably from about 4,000 to about 50,000, especially about 30,000. The ratio of acrylate to maleate segments in such copolymers will generally range from about 30:1 to about 1:1, more preferably from about 10:1 to 2:1. Water-soluble salts of such acrylic acid/maleic acid copolymers can include, for example, the alkali metal, ammonium and substituted ammonium salts. Soluble acrylate/maleate copolymers of this type are known materials which are described, for example, in European Patent Application No. 66915, published Dec. 15, 1982, which publication is incorporated herein by reference.

Another polymeric material which can be included is polyethylene glycol (PEG) which can have a molecular weight range of from about 500 to about 100,000, preferably from about 1,000 to about 50,000, more preferably from about 1,500 to about 10,000.

The preferred dispersing/antiredeposition agents are the acrylic/maleic copolymers, particularly those with an average molecular weight of from about 4,000 to about 50,000, and especially those with an average molecular weight of about 30,000, for example, ACUSOL® 505N which is commercially available from Rohm and Haas Company, Philadelphia, Pa. 19105.

The compositions of the present invention preferably do not contain any added hydrotropes (i.e. phosphate esters such as TRITON® H66 which is commercially available from Union Carbide, Danbury, Conn. 06817, sodium xylene sulfonate or ethanol). However, if a hydrotrope is desirable (i.e. in those compositions which comprise an alkyl polyglycoside in which the alkyl group contains 12 to 16 carbon atoms to an alkyl polyglycoside in which the alkyl group contains 8 to 10 carbon atoms in a 1:0 ratio and form a gel upon blending) the preferred hydrotropes are sodium xylene sulfonate in the range of from about 0.8% to about 2.4% by weight, preferably about 1.2% by weight, and ethanol in the range of about 1% up to about 5% by weight, preferably about 4% by weight. It has been discovered that the addition of one of these hydrotropes (sodium xylene sulfonate or ethanol) in the percent ranges given is sufficient to modify the rheology of the compositions comprising an alkyl polyglycoside in which the alkyl group contains 12 to 16 carbon atoms to an alkyl polyglycoside in which the alkyl group contains 8 to 10 carbon atoms in a 1:0 ratio from a gel to a liquid. Thus, the percent ranges given represent the amount of these hydrotropes which is effective to modify the rheology of these compositions and, therefore, represents an effective rheology modifying amount of such hydrotropes.

In addition to the ingredients described herein, the compositions of the invention may also contain one or more other ingredients for (a) assisting in or enhancing cleaning performance, or (b) modifying the appearance, color or other aesthetics of the compositions. Such ingredients include, but are not limited thereto, bleaching compounds, brighteners, carriers, processing aids, dyes, pigments and perfumes.

EXAMPLES

The following formulations (compositions) were prepared by following standard procedures which are well known to formulators of ordinary skill in the art and are meant to further illustrate the instant invention without, however, limiting it thereto. The values given for each ingredient in the following examples represent percentages by weight of the respective ingredients.

TABLE 1

| Ingredient (100% active basis) | Example No. | | | | | | | |
|---|---|---|---|---|---|---|---|---|
| | 1 | 2 | 3 | 4 | 5 | 6 | 7 | 8 |
| GLUCOPON ® 600 | 3.33 | 5.0 | 6.67 | 10.0 | 10.0 | 10.0 | — | — |
| GLUCOPON ® 225 | 6.67 | 5.0 | 3.33 | 0.0 | 0.0 | 0.0 | — | — |
| Nonylphenol 9 ethoxylate[(a)] | — | — | — | — | — | — | 5.0 | 5.0 |
| phosphate ester[(b)] | — | — | — | — | — | — | 8.8 | — |
| ethanol | — | — | — | — | — | 4.0 | — | — |
| sodium xylene sulfonate | — | — | — | — | 1.2 | — | — | — |
| potassium hydroxide | 17.0 | 17.0 | 17.0 | 17.0 | 17.0 | 17.0 | 17.0 | 17.0 |
| potassium silicate[(c)] | 14.0 | 14.0 | 14.0 | 14.0 | 14.0 | 14.0 | 14.0 | 14.0 |
| water[(d)] | bal. | bal. | bal. | bal. | bal. | bal. | bal. | bal. |

[(a)]TERGITOL ® NP-9.
[(b)]TRITON ® H66, 50% solids (Union Carbide), Lot #21392.
[(c)]KASIL ® #6, 39% solids, 2.5 ratio $SiO_2/K_2O$ (The PQ Corporation).
[(d)]The abbreviation bal. stands for balance.

TABLE 2

| Ingredient (100% active basis) | Example No. 9 | 10 | 11 | 12 | 13 | 14 | 15 | 16 |
|---|---|---|---|---|---|---|---|---|
| GLUCOPON ® 600 | 3.33 | 5.0 | 6.67 | 10.0 | 10.0 | 10.0 | — | — |
| GLUCOPON ® 225 | 6.67 | 5.0 | 3.33 | 0.0 | 0.0 | 0.0 | — | — |
| $C_{12-15}$ alkyl 7ethoxylate[(a)] | — | — | — | — | — | — | 7.0 | 7.0 |
| phosphate ester[(b)] | — | — | — | — | — | — | 8.5 | — |
| ethanol | — | — | — | — | — | 4.0 | — | — |
| sodium xylene sulfonate | — | — | — | — | 1.2 | — | — | — |
| potassium hydroxide | 12.6 | 12.6 | 12.6 | 12.6 | 12.6 | 12.6 | 12.6 | 12.6 |
| potassium silicate[(c)] | 4.7 | 4.7 | 4.7 | 4.7 | 4.7 | 4.7 | 4.7 | 4.7 |
| tetrapotassium pyrophosphate | 6.0 | 6.0 | 6.0 | 6.0 | 6.0 | 6.0 | 6.0 | 6.0 |
| acrylic/maleic copolymer[(d)] | 1.4 | 1.4 | 1.4 | 1.4 | 1.4 | 1.4 | 1.4 | 1.4 |
| water[(e)] | bal. | bal. | bal. | bal. | bal. | bal. | bal. | bal. |

[(a)]NEODOL ® 25-7.
[(b)]TRITON ® H66, 50% solids (Union Carbide), Lot #21392.
[(c)]KASIL ® #6, 39% solids, 2.5 ratio $SiO_2/K_2O$ (The PQ corporation).
[(d)]ACUSOL ® 505N, 35% solids, 30,000 MW (Rohm and Haas Company), Lot #42005A.
[(e)]The abbreviation bal. stands for balance.

It will be noted that the compositions of examples 11 and 13 are preferred for moderately alkaline industrial and institutional liquid cleaning applications, especially liquid laundry applications, whereas the compositions of examples 3 and 5 are preferred for highly alkaline industrial and institutional liquid cleaning applications, especially liquid laundry applications.

Test Procedures (A) The soil removal effectiveness (performance) of the compositions of the invention was determined by washing swatches of standardized dust-sebum soiled cotton cloth, mineral oil soiled cotton cloth, dust-sebum soiled dacron/cotton (65/35) cloth and mineral oil soiled dacron/cotton (65/35) cloth in a Terg-o-tometer apparatus using a 10 minute wash cycle at a water temperature of 140° F., a water hardness of 150 ppm (as $CaCO_3$, 2:1 Ca/Mg) and 0.2% or 0.4% by weight of the desired composition of the invention. The results are illustrated in Tables 3 and 4 and are expressed as delta reflectance units, wherein the higher the delta reflectance unit value the greater is the amount of soil that is removed.

TABLE 3

| cloth type | Example No. (0.2% by weight) 1 | 2 | 3 | 4 | 9 | 10 | 11 | 12 |
|---|---|---|---|---|---|---|---|---|
| Dust-sebum, Dacron/cotton | 7.41 | 12.58 | 17.16 | 19.39 | 9.93 | 15.11 | 20.57 | 22.33 |
| dust-sebum, cotton | 9.04 | 9.84 | 12.3 | 13.17 | 15.66 | 15.59 | 14.77 | 16.56 |
| mineral oil, Dacron/cotton | −1.48 | 2.43 | 5.72 | 7.26 | 1.61 | 4.28 | 7.68 | 11.08 |
| mineral oil, cotton | 10.34 | 10.57 | 13.48 | 14.75 | 17.59 | 18.01 | 18.76 | 18.02 |
| Total | 25.31 | 35.42 | 48.66 | 54.57 | 44.79 | 52.99 | 61.78 | 67.99 |

TABLE 4

| cloth type | Example No. (0.4% by weight) 1 | 2 | 3 | 4 | 9 | 10 | 11 | 12 |
|---|---|---|---|---|---|---|---|---|
| Dust-sebum, Dacron/cotton | 22.19 | 23.78 | 23.7 | 24.88 | 25.83 | 25.93 | 25.41 | 24.43 |
| dust-sebum, cotton | 11.36 | 13.71 | 15.18 | 16.37 | 18.95 | 17.6 | 18.68 | 18.91 |
| mineral oil, Dacron/cotton | 8.29 | 10.29 | 11.0 | 12.57 | 10.67 | 11.96 | 11.05 | 12.21 |
| mineral oil, cotton | 14.06 | 17.68 | 17.43 | 20.06 | 16.4 | 16.81 | 18.95 | 19.12 |
| Total | 55.9 | 65.46 | 67.31 | 73.88 | 71.85 | 72.3 | 74.09 | 74.64 |

The results in Tables 3 and 4 show that the liquid laundry cleaning compositions of the instant invention (those that contain an alkyl polyglycoside in which the alkyl group contains 12 to 16 carbon atoms to an alkyl polyglycoside in which the alkyl group contains 8 to 10 carbon atoms in a ratio of 1:1 to 1:0, i.e. examples 2–4 and 10–12) unexpectedly exhibited improved cleaning performance over those cleaning compositions which contain an alkyl polyglycoside in which the alkyl group contains 12 to 16 carbon atoms to an alkyl polyglycoside in which the alkyl group contains 8 to 10 carbon atoms in a ratio of 1:2 (see examples 1 and 9).

(B) The shelf-life stability of the compositions of the invention over a 2 month period was determined at 20° F., 72° F., and 110° F. and the results are illustrated in Table 5.

TABLE 5

| | Example No. | | | | | | | | | | | | | | | |
|---|---|---|---|---|---|---|---|---|---|---|---|---|---|---|---|---|
| Temp. | 1 | 2 | 3 | 4 | 5 | 6 | 7 | 8 | 9 | 10 | 11 | 12 | 13 | 14 | 15 | 16 |
| 20° F. | +[2] | +[2] | +[3] | gel | +[4] | +[4] | + | nd | + | + | +[3] | gel | +[4] | +[4] | – | nd |
| 72° F. | + | + | + | gel | + | + | + | –[1] | + | + | + | gel | + | + | + | –[1] |
| 110° F. | + | + | + | gel | + | + | + | nd | + | + | + | gel | + | + | – | nd |

– means two liquid phases.
+ means single liquid phase.
[1]immediate separation.
[2]crystals present which dissolve at 68° F.
[3]milky white, clears when warmed to 68° F.
[4]white solid which becomes clear and fluid at 68° F.
nd = not determined.

The results in Table 5 illustrate that the liquid cleaning compositions of the instant invention are soluble and stable without the addition of a hydrotrope, or at most they require small amounts of inexpensive solubilizing reagents (hydrotropes) such as ethanol or sodium xylene sulfonate (see examples 5–6 and 13–14). These results are in direct contrast to the results obtained when conventional industrial and institutional "one shot" systems based on ethoxylated alcohols( i.e. linear alcohol ethoxylates and alkylphenol ethoxylates, see examples 7–8 and 15–16) are utilized in that those systems are unstable in the absence of a significantly larger amount of a more expensive hydrotrope, i.e. a phosphate ester (it should be further noted that ethanol and sodium xylene sulfonate are generally ineffective as hydrotroping agents in systems of this type).

The stability results obtained for the instant cleaning compositions which contain no added hydrotrope are even more surprising when functional ingredients such as polycarboxylates, i.e. acrylic/maleic copolymers such as ACUSOL® 505N, are included in the compositions. These polycarboxylates tend to cause liquid-liquid phase separation even when using some of the best hydrotropes in conventional "one shot" systems. In the instant compositions, however, stable compositions are obtained without liquid-liquid phase separation and without any added hydrotrope (see examples 10–11).

While the present compositions of the invention have been described and illustrated by reference to certain representative examples and embodiments thereof, such is not to be interpreted as in any way limiting the scope of the instantly claimed invention.

What is claimed is:

1. An industrial and institutional liquid cleaning composition which comprises:

(a) from about 1% to about 30% active by weight of a 1:1 to 1:0 mixture of an alkyl polyglycoside in which the alkyl group contains 12 to 16 carbon atoms to an alkyl polyglycoside in which the alkyl group contains 8 to 10 carbon atoms;

(b) from 0% to about 50% by weight of an alkali metal hydroxide;

(c) from 0% to about 40% by weight of an alkali metal silicate;

(d) from 0% to about 40% by weight of a builder;

(e) from 0% to about 5% by weight of a dispersing/antiredeposition agent;

(f) from about 5% to about 75% by weight of water; and (g) from 0% to about 5% by weight of a hydrotrope, with the proviso that the sum of the percentages for the alkali metal hydroxide, alkali metal silicate and the builder must be greater than zero; and wherein the composition is free from ethoxylated alcohols and alkylphenol ethoxylates.

2. A composition according to claim 1 which comprises:

(a) from about 10% to about 20% active by weight of said 1:1 to 1:0 mixture of an alkyl polyglycoside in which the alkyl group contains 12 to 16 carbon atoms to an alkyl polyglycoside in which the alkyl group contains 8 to 10 carbon atoms;

(b) from about 12% to about 45% by weight of said alkali metal hydroxide;

(c) from about 2% to about 36% by weight of said alkali metal silicate;

(d) from 0% to about 10% by weight of said builder;

(e) from 0% to about 4% by weight of said dispersing/antiredeposition agent;

(f) from about 25% to about 75% by weight of said water; and (g) from 0% to about 5% by weight of a hydrotrope selected from ethanol or sodium xylene sulfonate.

3. A composition according to claim 2 which comprises:

(a) about 10% active by weight of said 1:1 to 1:0 mixture of an alkyl polyglycoside in which the alkyl group contains 12 to 16 carbon atoms to an alkyl polyglycoside in which the alkyl group contains 8 to 10 carbon atoms;

(b) from about 12.6% to about 17% by weight of said alkali metal hydroxide;

(c) from about 4.7% to about 14% by weight of said alkali metal silicate;

(d) from 0% to about 6% by weight of said builder;

(e) from 0% to about 1.4% by weight of said dispersing/antiredeposition agent;

(f) from about 40% to about 75% by weight of said water; and (g) from 0% to about 5% by weight of ethanol or from 0% to about 2.4% by weight of sodium xylene sulfonate.

4. A composition according to claim 3 wherein said alkyl polyglycoside in which the alkyl group contains 12 to 16 carbon atoms has an average degree of polymerization of 1.4 glucose units.

5. A composition according to claim 4 wherein said alkyl polyglycoside in which the alkyl group contains 8 to 10 carbon atoms has an average degree of polymerization of 1.6 glucose units.

6. A composition according to claim 2 wherein said alkali metal hydroxide is sodium or potassium hydroxide.

7. A composition according to claim 2 wherein said alkali metal silicate is a potassium or sodium silicate.

8. A composition according to claim 2 wherein said builder is an alkali metal pyrophosphate.

9. A composition according to claim 2 wherein said dispersing/antiredeposition agent is an acrylic/maleic copolymer.

10. A composition according to claim 2 wherein the composition contains at least one of sodium hydroxide, potassium hydroxide, sodium silicate, potassium silicate, an alkali metal pyrophosphate, and an acrylic/maleic copolymer.

11. A composition according to claim 10 wherein said acrylic/maleic copolymer has an average molecular weight of from about 4,000 to about 50,000.

12. A method for cleaning a hard surface comprising contacting the hard surface with a cleaning composition comprising (a) from about 1% to about 30% active by weight of a 1:1 to 1:0 mixture of an alkyl polyglycoside in which the alkyl group contains 12 to 16 carbon atoms to an alkyl polyglycoside in which the alkyl group contains 8 to 10 carbon atoms;

(b) from 0% to about 50% by weight of an alkali metal hydroxide;

(c) from 0% to about 40% by weight of an alkali metal silicate;

(d) from 0% to about 40% by weight of a builder;

(e) from 0% to about 5% by weight of a dispersing/antiredeposition agent;

(f) from about 5% to about 75% by weight of water; and (g) from 0% to about 5% by weight of a hydrotrope;

with the proviso that the sum of the percentages for the alkali metal hydroxide, alkali metal silicate and the builder must be greater than zero.

13. A method of claim 12 wherein the cleaning composition comprises (a) from about 10% to about 20% active by weight of said 1:1 to 1:0 mixture of an alkyl polyglycoside in which the alkyl group contains 12 to 16 carbon atoms to an alkyl polyglycoside in which the alkyl group contains 8 to 10 carbon atoms;

(b) from about 12% to about 45% by weight of said alkali metal hydroxide;

(c) from about 2% to about 36% by weight of said alkali metal silicate;

(d) from 0% to about 10% by weight of said builder;

(e) from 0% to about 4% by weight of said dispersing/antiredeposition agent;

(f) from about 25% to about 75% by weight of said water; and (g) from 0% to about 5% by weight of a hydrotrope selected from ethanol or sodium xylene sulfonate.

14. The method of claim 13 wherein the cleaning composition is free from ethoxylated alcohols and alkylphenol ethoxylates.

15. The method of claim 12 wherein the cleaning composition comprises (a) about 10% active by weight of said 1:1 to 1:0 mixture of an alkyl polyglycoside in which the alkyl group contains 12 to 16 carbon atoms to an alkyl polyglycoside in which the alkyl group contains 8 to 10 carbon atoms;

(b) from about 12.6% to about 17% by weight of said alkali metal hydroxide;

(c) from about 4.7% to about 14% by weight of said alkali metal silicate;

(d) from 0% to about 6% by weight of said builder;

(e) from 0% to about 1.4% by weight of said dispersing/antiredeposition agent;

(f) from about 40% to about 75% by weight of said water; and (g) from 0% to about 5% by weight of ethanol or from 0% to about 2.4% by weight of sodium xylene sulfonate.

16. The method of claim 15 wherein in the cleaning composition said alkyl polyglycoside in which the alkyl group contains 12 to 16 carbon atom has an average degree of polymerization of 1.4 glucose units.

17. The method of claim 16 wherein the cleaning composition is free from ethoxylated alcohols and alkylphenol ethoxylates.

18. The method of claim 15 wherein the cleaning composition is free from ethoxylated alcohols and alkylphenol ethoxylates.

19. The method of claim 12 wherein the cleaning composition contains at least one of sodium hydroxide, potassium hydroxide, sodium silicate, potassium silicate, an alkali metal pyrophosphate, and an acrylic/maleic copolymer.

20. The method of claim 19 wherein the cleaning composition is free from ethoxylated alcohols and alkylphenol ethoxylates.

21. The method of claim 12 wherein the cleaning composition is free from ethoxylated alcohols and alkylphenol ethoxylates.

* * * * *